United States Patent
Lefebvre et al.

(10) Patent No.: US 11,105,222 B1
(45) Date of Patent: Aug. 31, 2021

(54) INTEGRATED THERMAL PROTECTION FOR AN EXHAUST CASE ASSEMBLY

(71) Applicant: PRATT & WHITNEY CANADA CORP., Longueuil (CA)

(72) Inventors: Guy Lefebvre, St-Bruno-de-Montarville (CA); Francois Doyon, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/804,461

(22) Filed: Feb. 28, 2020

(51) Int. Cl.
| | |
|---|---|
| F01D 25/16 | (2006.01) |
| F01D 25/30 | (2006.01) |
| F01D 25/12 | (2006.01) |
| F16C 17/24 | (2006.01) |
| F01D 25/28 | (2006.01) |
| F01D 25/14 | (2006.01) |

(52) U.S. Cl.
CPC .......... *F01D 25/16* (2013.01); *F01D 25/125* (2013.01); *F01D 25/28* (2013.01); *F01D 25/30* (2013.01); *F16C 17/243* (2013.01); *F01D 25/145* (2013.01); *F16C 2202/24* (2013.01)

(58) Field of Classification Search
CPC .......... F01D 25/16; F01D 25/28; F01D 25/30; F01D 25/125; F01D 25/145; F16C 17/243; F16C 2202/24
USPC ....... 415/104, 115, 116, 213.1, 214.1, 219.1, 415/220
See application file for complete search history.

(56) References Cited

U.S. PATENT DOCUMENTS

| | | | |
|---|---|---|---|
| 2,791,091 A * | 5/1957 | Wheatley | F02C 7/18 60/806 |
| 3,826,088 A | 7/1974 | Nash et al. | |
| 3,999,376 A * | 12/1976 | Jeryan | F01D 25/26 60/799 |
| 4,798,048 A | 1/1989 | Clements | |
| 10,077,681 B2 | 9/2018 | Preston | |
| 2020/0166004 A1* | 5/2020 | Farah | F01D 25/162 |

* cited by examiner

*Primary Examiner* — Hoang M Nguyen
(74) *Attorney, Agent, or Firm* — Norton Rose Fulbright Canada LLP

(57) ABSTRACT

A gas turbine engine exhaust case assembly comprises: an exhaust case having an axis and defining an annular gas path; a bearing housing coaxially supported within the exhaust case; an exhaust cone coaxial and rearward of the exhaust case; a heat shield joined to the exhaust cone, the heat shield being disposed radially between the exhaust cone and the bearing housing; and a mounting bracket extending from the exhaust case and joining the exhaust case and the exhaust cone together.

20 Claims, 6 Drawing Sheets

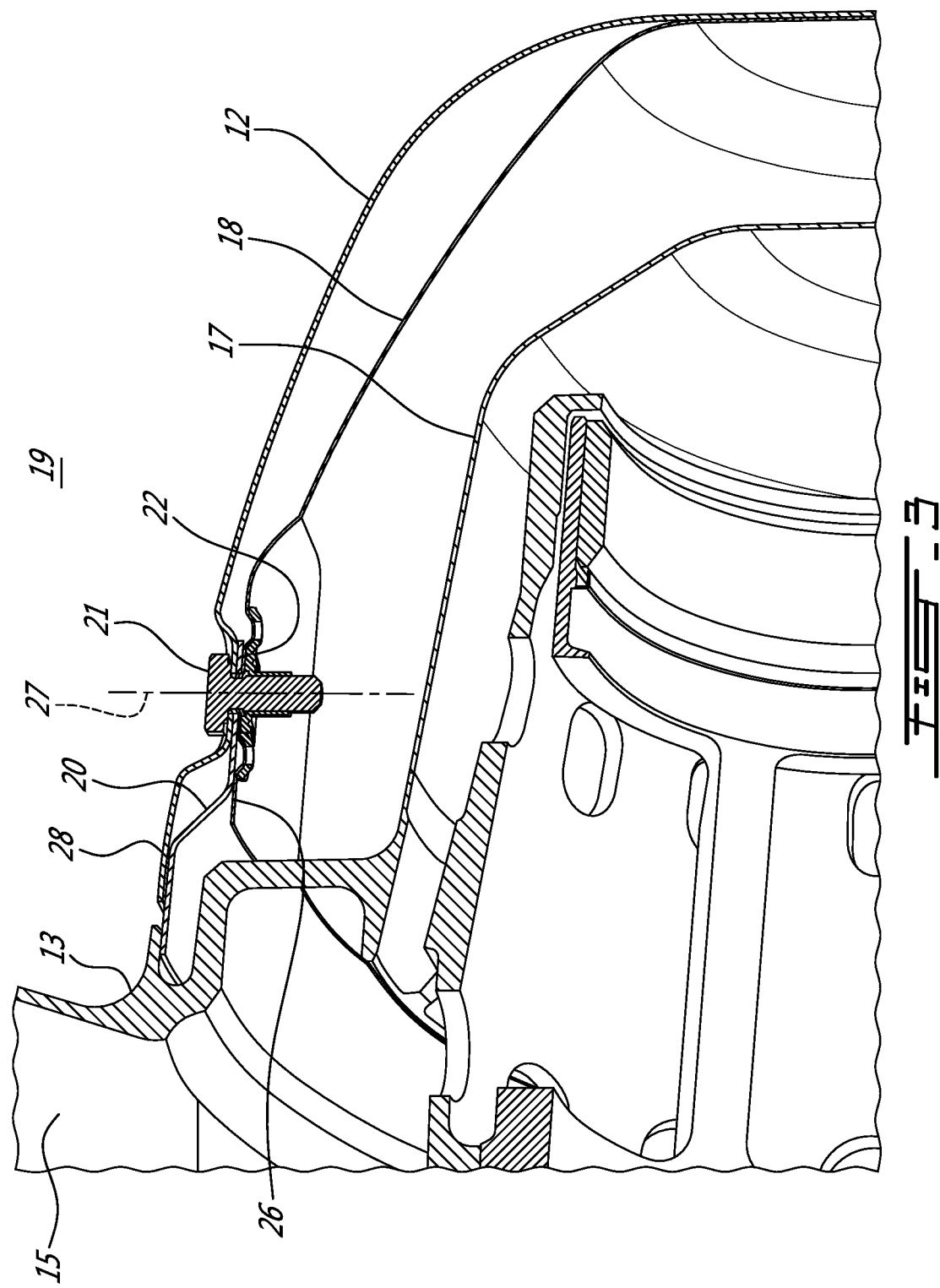

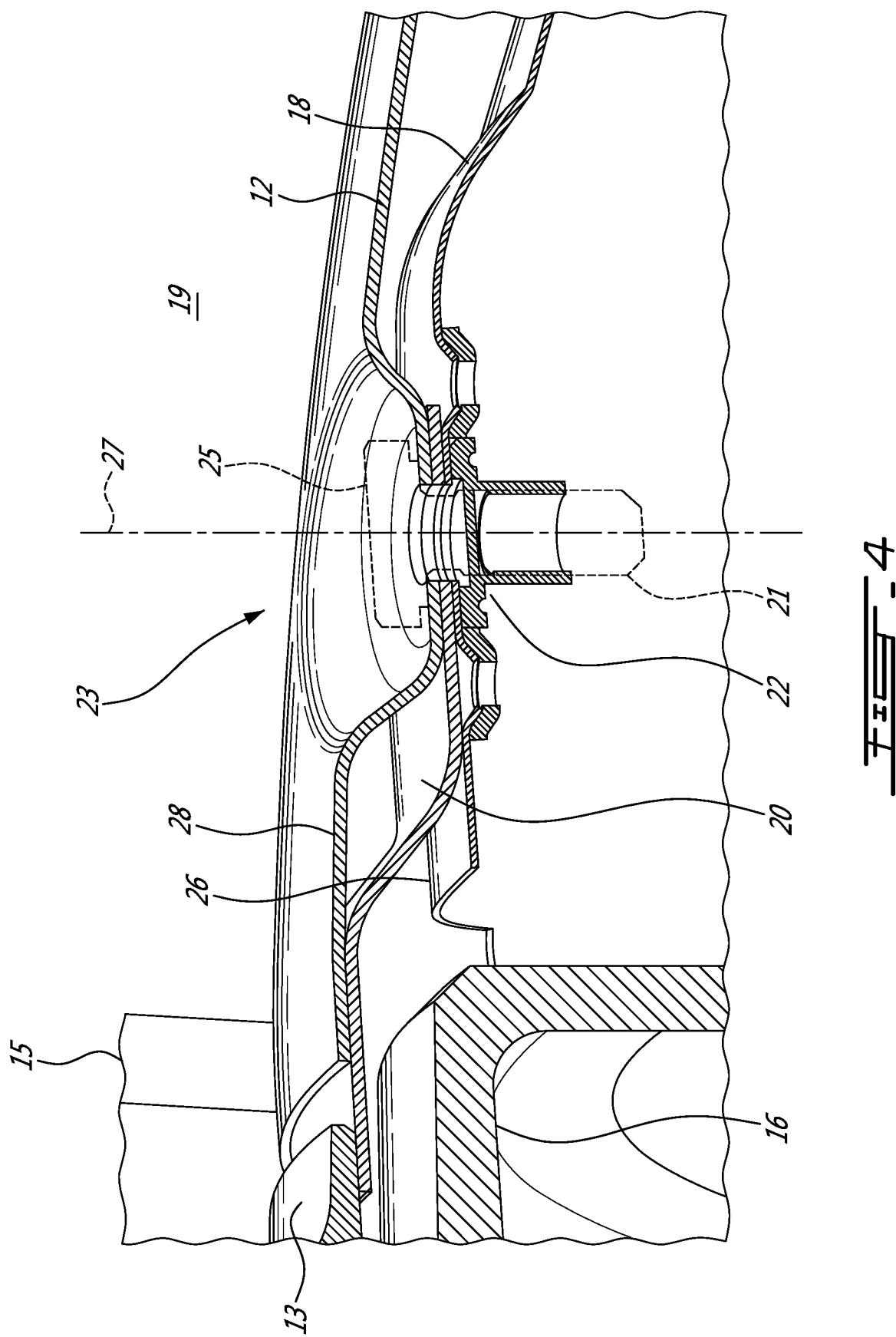

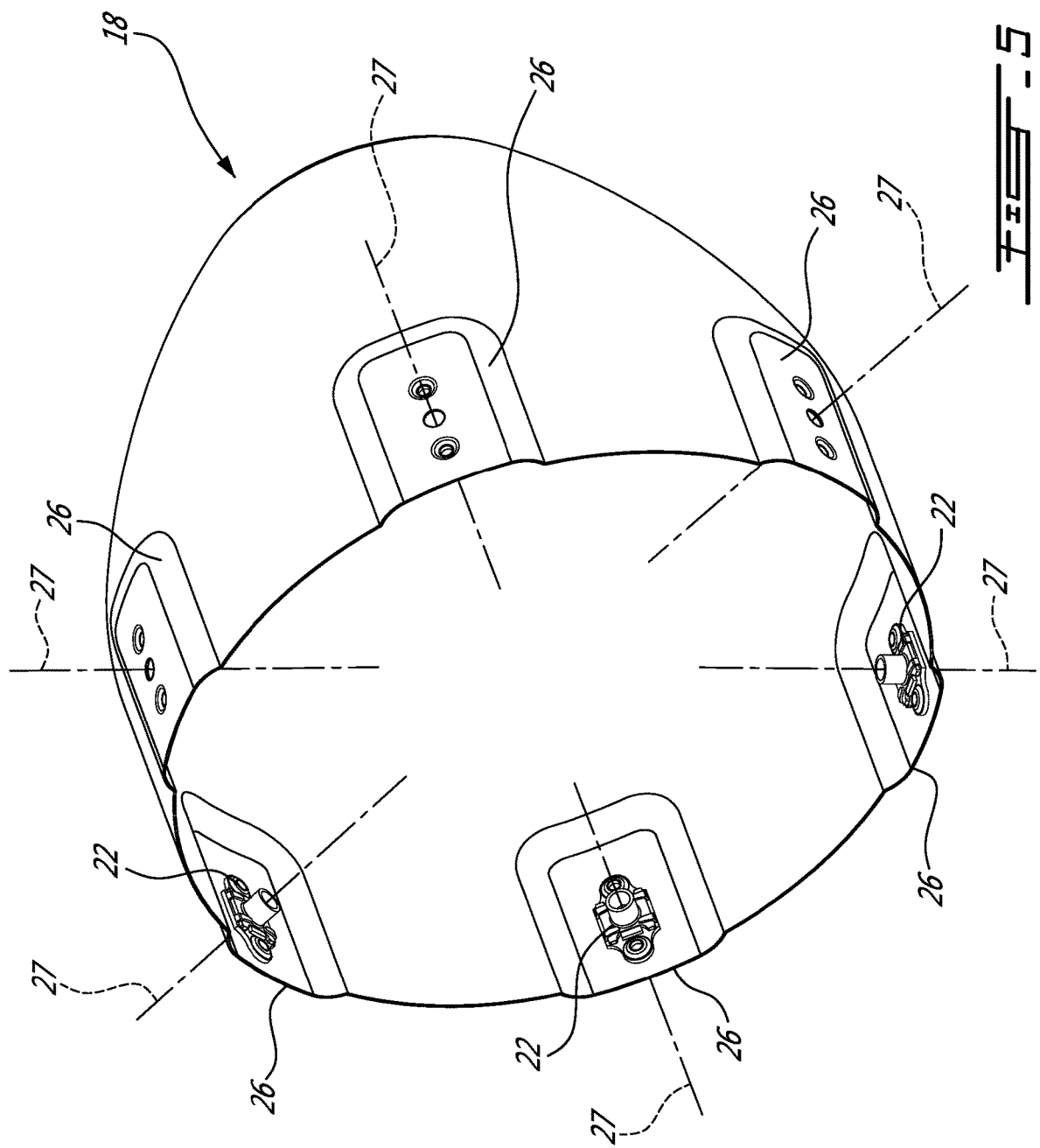

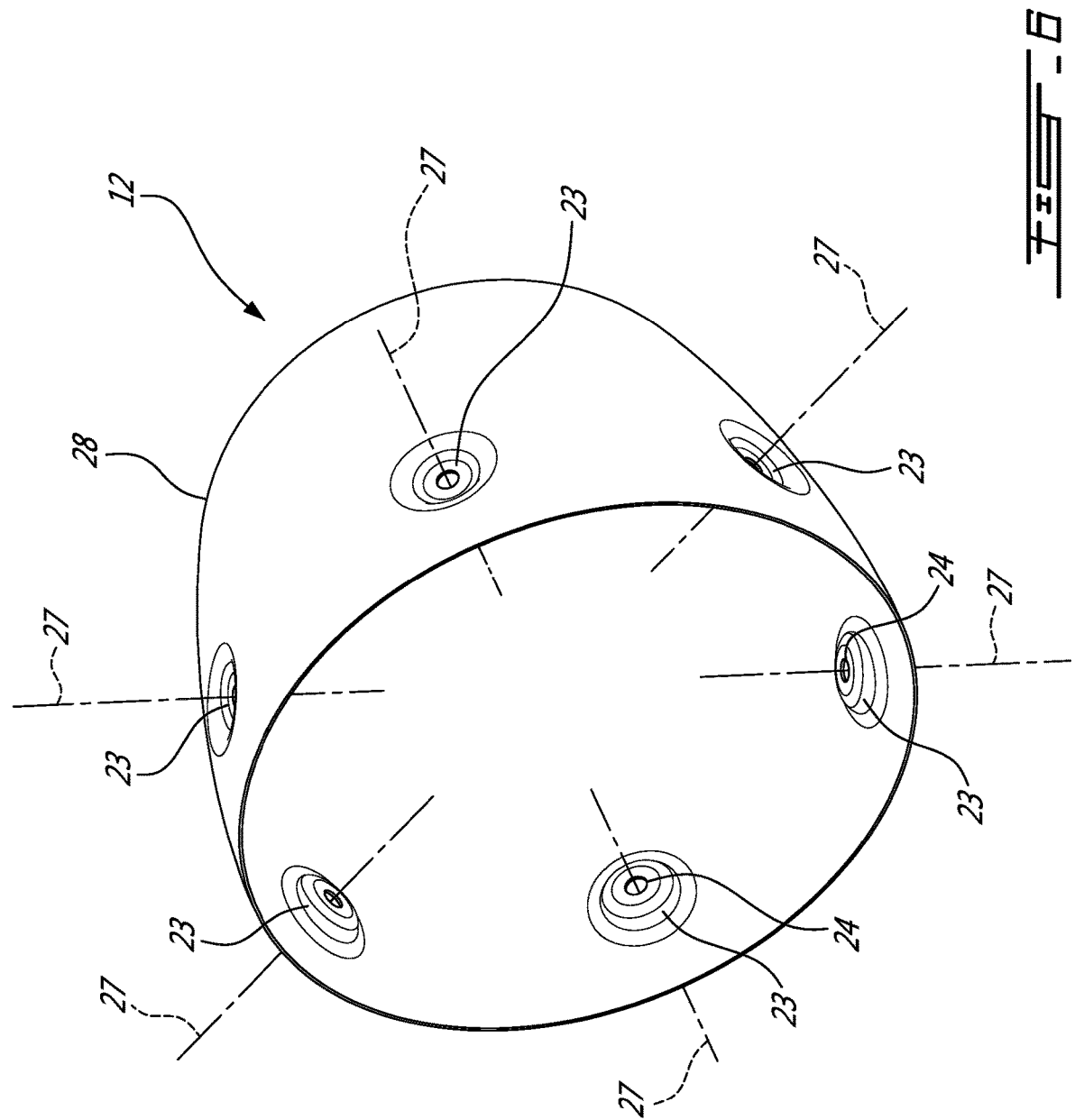

US 11,105,222 B1

INTEGRATED THERMAL PROTECTION FOR AN EXHAUST CASE ASSEMBLY

TECHNICAL FIELD

The disclosure generally relates to a mechanical arrangement for the exhaust case of a gas turbine engine that includes an integrated heat shield to thermally protect the oil within a bearing housing.

BACKGROUND

In a gas turbine engine, the combustion gases flow through the turbine stages and an exhaust case before passing over an inward exhaust cone to exit the engine. The exhaust case has an outer annular shroud and an inner core joined with radial struts for supporting a bearing housing. The bearing housing requires oil flow to cool and lubricate the bearings.

The hot exhaust gases have a temperature that heat the exhaust case, exhaust cone and internal bearing housing through surface contact and thermal conduction. The oil within the bearing housing can be overheated beyond the optimal operating temperature range. Overheated oil may degrade in effectiveness and require more frequent replacement. Mechanical damage may occur as a result of the degraded oil properties.

A thermal blanket of heat insulating material may be fitted to the bearing housing to protect the oil that circulates within. However, such thermal blankets can be expensive and are required to be accurately fitted to avoid fretting, vibration and physical damage. Improvement is desirable.

SUMMARY

The disclosure describes an exhaust case assembly for a gas turbine engine, the exhaust case assembly comprising: an exhaust case having an axis and defining an annular gas path; a bearing housing coaxially supported within the exhaust case; an exhaust cone coaxial and rearward of the exhaust case; a heat shield joined to the exhaust cone, the heat shield being disposed radially between the exhaust cone and the bearing housing; and a mounting bracket extending from the exhaust case and joining the exhaust case and the exhaust cone together.

In a further aspect the disclosure describes a method of heat shielding a bearing housing of a gas turbine engine, the bearing housing being within and coaxial to an exhaust case of the gas turbine engine, the method comprising: joining a heat shield to an internal surface of an exhaust cone; and then securing the exhaust cone to a mounting bracket extending from the exhaust case, the exhaust case defining an annular gas path.

Further details of these and other aspects of the subject matter of this application will be apparent from the detailed description included below and the drawings.

DESCRIPTION OF THE DRAWINGS

FIG. 3 is a partially cutaway axial isometric view of the shaft bearing housing and exhaust case, with the exhaust cone and heat shield secured to the annular mounting bracket.

FIG. 4 is a detail axial sectional view of the bolt connector and nut plate joining the mounting bracket between an inward recess in the exhaust cone and an outward embossment in the heat shield.

FIG. 5 is an isometric view of the heat shield having an array of six outward embossments with nut plates to secure the bolts in a blind connection.

FIG. 6 is an isometric view of the exhaust cone having an array of six inward recesses with bores for receiving the bolt connectors.

DETAILED DESCRIPTION

Figure 1:
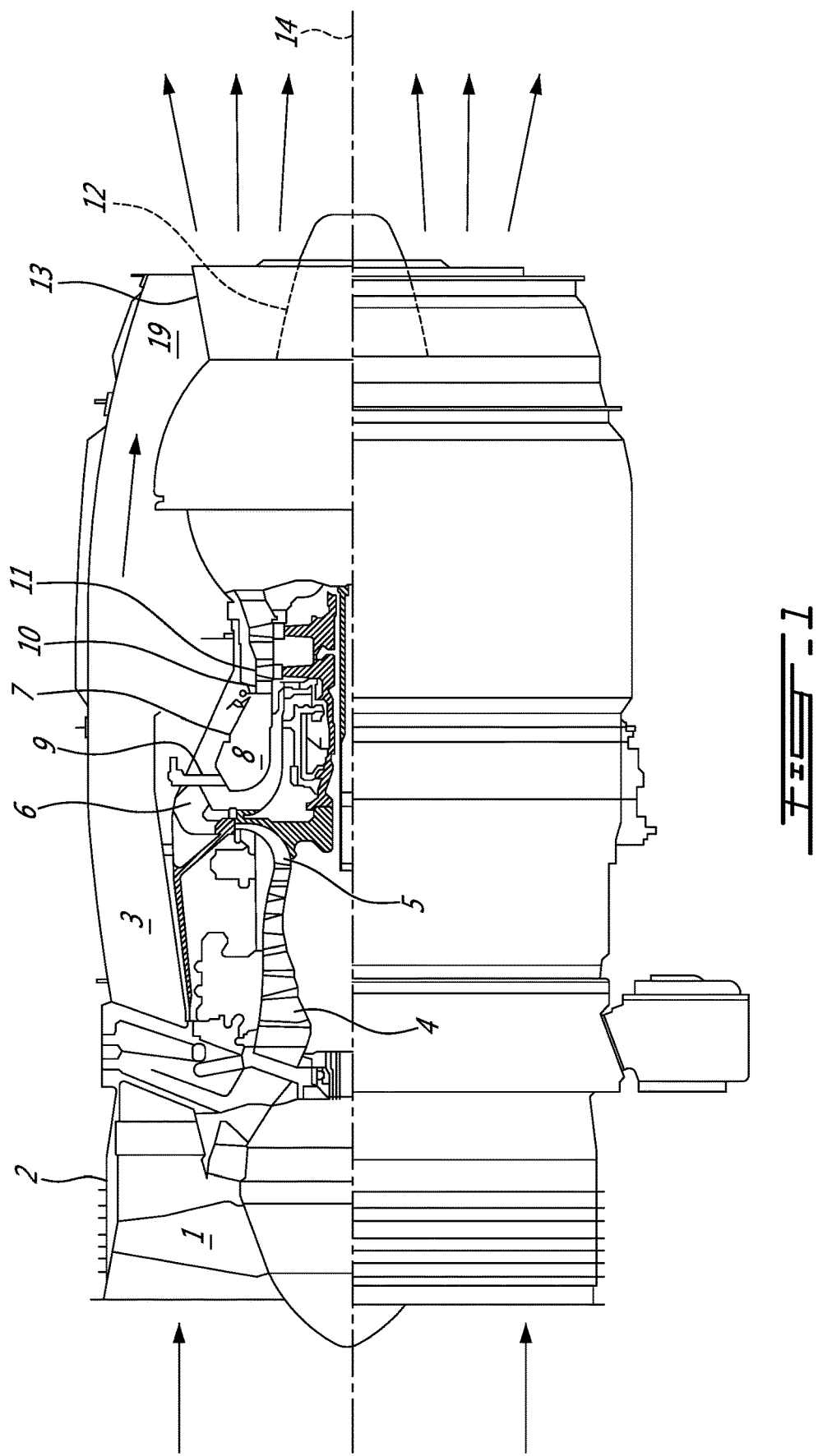
FIG. 1 shows an axial cross-section view of an example turbo-fan gas turbine engine with an exhaust cone to the right as drawn.

FIG. 1 shows an axial cross-section through an example aircraft engine. In the illustrated embodiment, the aircraft engine is a turbo-fan gas turbine engine. However, it is understood that the aircraft engine could adopt various other forms, such as a turboshaft, a turboprop or a compounded engine. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor through a diffuser 6 and is contained within a plenum 7 that surrounds the combustor 8. Fuel is supplied to the combustor 8 through fuel tubes 9 and fuel is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling the turbines to eventually mix with the hot gases from the combustor and pass over the nozzle guide vane 10 and turbine blades 11 before exiting the engine passing over the exhaust cone 12. In general the exhaust cone 12, the surrounding exhaust case 13 and most engine components are axisymmetric about the central engine axis 14 of rotation.

Figure 2:
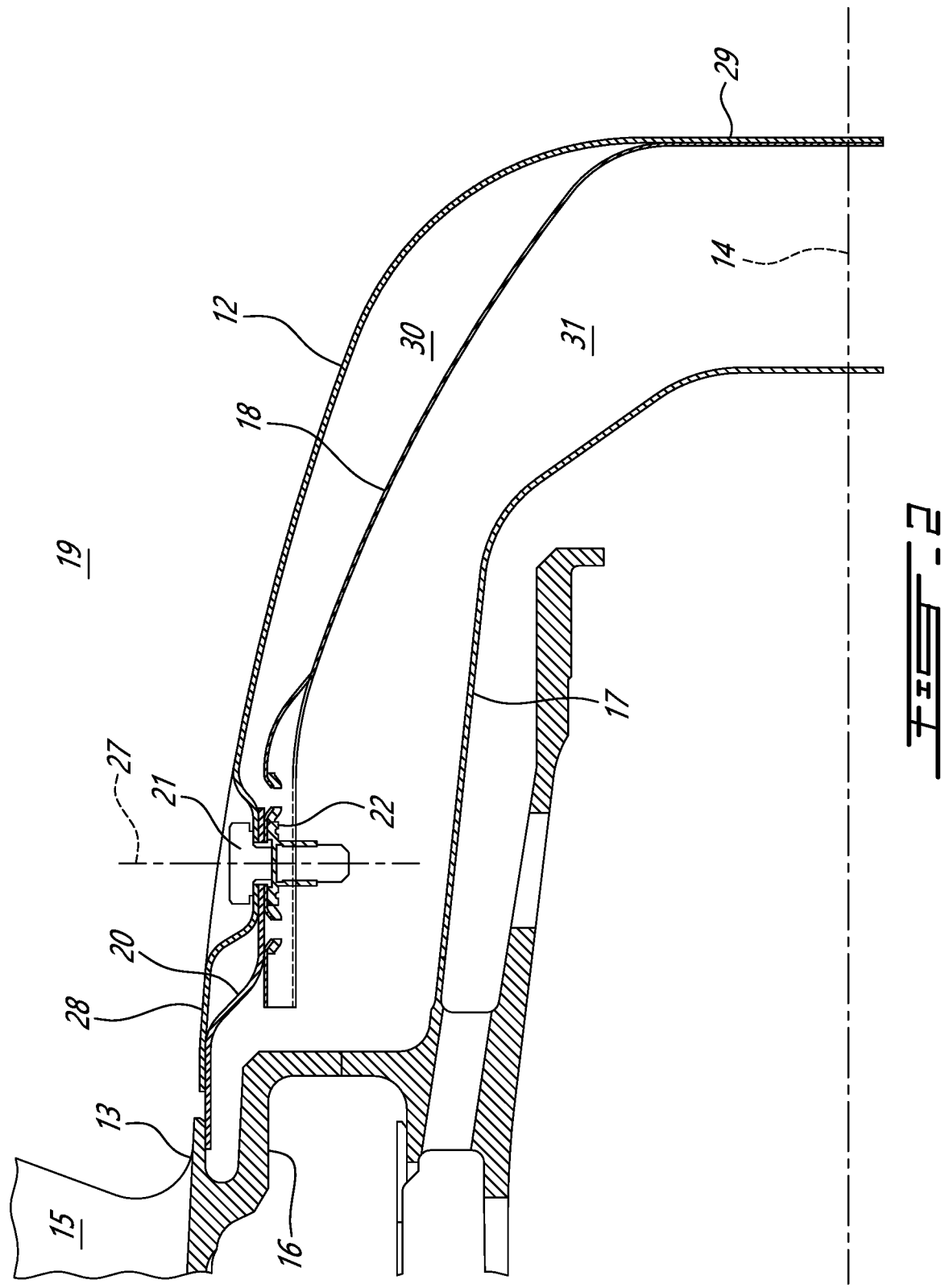
FIG. 2 is a detail axial sectional view of the exhaust cone with an integral heat shield secured with bolt and nut plate connectors to an annular mounting bracket of an exhaust case that supports an inward coaxial shaft bearing housing.

FIG. 2 shows a half axial section through the exhaust cone 12 and exhaust case 13 which are both stationary and axisymmetric about the central axis 14 of rotation. The exhaust case 13 includes radial struts 15 that support an annular core 16 and a centrally located shaft bearing housing 17. The shaft and bearings are not shown in the drawings.

According to one aspect, the present description and drawings describe the use of an integrated heat shield 18 that is secured to the exhaust cone 12 and serves to protect the bearing housing 17 from thermal exposure originating in the exhaust hot gas path 19.

In conjunction with FIG. 2, a partially cutaway axial isometric view of the bearing housing 17 and exhaust case 13 is shown in FIG. 3. The integral or pre-assembled exhaust cone 12 and heat shield 18 are secured to the exhaust case 13 with an annular mounting bracket 20 that extends aftward from the exhaust case 13. According to one embodiment, the heat shield 18 and the exhaust cone 12 are manufactured as separate components to be pre-assembled together as a unitary module, which is then connected to the exhaust case 13. According to another embodiment, the exhaust cone 12 and the heat shield 18 are manufactured as a unitary body which is then assembled to the exhaust case 13. A circumferentially spaced apart array of bolts 21 and nut plates 22 provide a blind hole connection to secure the integral heat shield 18 and exhaust cone 12 to the annular mounting bracket 20 extending from the exhaust case 13. The mounting bracket can be integrally formed with the exhaust case 13 or separately attached thereto.

FIG. 4 shows details of an embodiment of the connectors, namely the bolt 21 and nut plate 22 joining the mounting bracket 20, the exhaust cone 12 and the heat shield 18 together at a plurality of points (6 in the illustrated example) about the circumference.

FIG. 6 illustrates the interior surface and exterior surface 28 of the exhaust cone 12. To minimize heat conduction and exposure to the hot gas path 19, the exhaust cone 12 has a circumferential array of inward recesses 23 (6 in the illustrated example) with bores 24 for receiving the bolts 21 (see FIGS. 2-4). As best seen in FIG. 4, the inward recess 23 helps reduce incidence of the hot gas flow on the head 25 of the bolt 21 and may help reduce turbulence of the hot gas flow in the vicinity in at least some operating conditions. Other arrangements such as a conical shaped recess and a bolt with a cone shaped countersunk socket head can also provide protection from the hot gas flow.

FIG. 5 illustrates the interior and exterior surfaces of the heat shield 18. To provide a minimal point contact with the interior surfaces of the inward recesses 23 of the exhaust cone 12 (see FIG. 6), the heat shield 18 has a circumferential array of six outward embossments 26. According to the illustrated embodiment, the centers of the bolts 21, nut plates 22, recesses 23 and embossments 26 are aligned on six radial axes 27. The minimal contact area of the connection region reduces conductive heat transfer from the hot gas path 19, through the bolts 21 and recesses 23 of the exhaust cone 12, to the heat shield 18 and nut plates 22 in the area of the six embossments 26. Each of the six embossments 26 have nut plates 22 to secure the bolts 21 in a blind connection accessible from the exterior surface of the exhaust cone 12.

Referring to FIGS. 2-6, the drawings and above brief description disclose an exhaust case assembly with an integral heat shield 18 for a gas turbine engine (see FIG. 1). The exhaust case assembly includes an exhaust case 13 being axisymmetric about the engine axis 14 of rotation. The exhaust case 13 defines an annular gas path 19 between a radially outer shroud (not shown) and an annular inner core 16. A bearing housing 17 is coaxially supported within the core 16 of the exhaust case 13. The exhaust cone 12 is disposed coaxially and rearward of the supporting exhaust case 13. As seen in FIG. 2, an external surface 28 of the exhaust cone 12 merges with an inner boundary of the annular hot gas path 19.

As seen in FIG. 2, the heat shield 18 may be joined to the exhaust cone 12 at a downstream end 29 with spot welds or other mechanical connectors. The heat of the gases has dissipated when flowing over the downstream end 29. It can be appreciated that the downstream end 29 includes an axially facing end surface of the exhaust cone 12. According to the illustrated embodiment, the axially end surface of the exhaust cone 12 has a substantially flat surface normal to the engine centerline. The heat shield can be welded or otherwise suitably joined to an inner face of the axially end surface of the downstream end 29 of the exhaust cone 12. The downstream end 29 includes the axially facing end surface of the exhaust cone 12. The gas temperature at the downstream end 29 is lower than the upstream portion of the external surface 28 and so the degree of heat conduction through contact at the downstream end 29 is reduced. The heat shield 18 is disposed radially between the exhaust cone 12 and the bearing housing 17 to shield the oil within the bearing housing 17 from excessive heat. The air filled gap 30 between the exhaust cone 12 serves to insulate the bearing housing 17 from heat conduction. The air filled gap 31 between the heat shield 18 and the shaft bearing housing 17 further insulates the bearing housing 17 from heat.

Both air filled gaps 30, 31 may be supplied with a flow of cooling air if desired to further regulate the temperature of the exterior of the bearing housing. For example, air flow outlets (not shown) may be located in the downstream end 29 and inlet air may be provided to the gaps 30, 31 by the core 16 of the exhaust case 13 or by the air flow provided to the bearing housing 17.

As seen in FIGS. 2-4, the annular mounting bracket 20 extends from the exhaust case 13. In the example illustrated, the annular mounting bracket 20 is secured to the exhaust case 12 and the exhaust cone 18 together with six bolts 21 and nut plates 22.

Referring to FIGS. 4-6 circumferential array of connectors, namely bolts 21 and nut plates 22, join the exhaust case 12 and exhaust cone 18 together on a plurality of radial axes 27. The external surface 28 of the exhaust cone 12 includes a circumferential array of inward recesses 23 aligned on the radial axes 27. The bolts 21 have a head 25 housed within the inward recesses 23 to avoid the direct flow of hot gas and reduce turbulence.

In the example illustrated, the mounting bracket 20 includes six bores aligned on the six radial axes 27 through which the bolts 21 extend. The exhaust cone 12 18 also includes six bores 24 (see FIG. 6) aligned with the holes in the nut plates 22 on the radial axes 27. The drawings show a bolt 21 and a fixed inward blind hole nut in the form of a nut plate 22, however other types of connectors can be used such as rivets or spot welds. Bolts 21 and nut plates 22 provide the advantage of easy disassembly with a blind or one sided connection accessible from the exterior of the exhaust cone 12. Alternative fixed inward blind hole nuts in place of the nut plate 22 could include a clip nut, a press fit nut, or a welded nut (not shown) disposed on an internal surface of the heat shield 18.

As seen in FIG. 5, the external surface of the heat shield 18 can include outwardly extending bosses or embossments 26 aligned on the radial axes 27. The heat shield 18 can have a sheet metal body with outwardly extending bosses welded to the surface or embossments 26 formed by stamping or pressing in a die.

In the embodiment shown in FIGS. 2-4, the mounting bracket 20 is inserted and clamped between the exhaust cone 12 and the heat shield 18. Alternatively, the nut plates 22 could be located on an inward surface of the mounting bracket 20, and a sleeve spacer (not shown) can be positioned between the heat shield 18 and the exhaust cone 12 to maintain an insulating separation or air filled gap.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, the cone and the heat shield can be made of formed or rolled sheet metal. While the illustrated embodiment shows a heat shield being resistance welded to the cone, it is understood that the heat shield could be riveted, bolted or otherwise suitably secured to the aft of the cone, where the temperature is lower than the conical surface. While nut plates are used as self-locking feature for the bolts, it is understood that the nut plates could be replaced by clip nuts or any other blind assembly nuts. Yet further modifications could be implemented by a person of ordinary skill in the art in view of the present disclosure, which modifications would be within the scope of the present technology.

What is claimed is:

1. An exhaust case assembly for a gas turbine engine, the exhaust case assembly comprising:
   an exhaust case having an axis and defining an annular gas path;
   a bearing housing coaxially supported within the exhaust case;
   an exhaust cone coaxial with and rearward of the exhaust case;
   a heat shield joined to the exhaust cone, the heat shield being disposed radially between the exhaust cone and the bearing housing; and
   a mounting bracket extending from the exhaust case and joining the exhaust case and the exhaust cone together.

2. The exhaust case assembly according to claim 1, comprising a circumferential array of connectors extending through the mounting bracket for joining the exhaust case and exhaust cone together on a plurality of radial axes.

3. The exhaust case assembly according to claim 2, wherein an external surface of the exhaust cone merges with an inner boundary of the annular gas path, the external surface of the exhaust cone having a circumferential array of inward recesses, and wherein the connectors have a head housed within the inward recesses.

4. The exhaust case assembly according to claim 3, wherein the mounting bracket includes bores aligned on the radial axes through which the connectors extend.

5. The exhaust case assembly according to claim 4, wherein the connectors include a bolt and a fixed inward blind hole nut.

6. The exhaust case assembly according to claim 5, wherein the heat shield includes bores aligned on the radial axes through which the bolts extend, and the fixed inward blind hole nuts comprise one of: a nut plate; a clip nut; press fit nut; and a welded nut disposed on an internal surface of the heat shield.

7. The exhaust case assembly according to claim 6, wherein an external surface of the heat shield includes outwardly extending bosses aligned on the radial axes.

8. The exhaust case assembly according to claim 6, wherein the heat shield has a sheet metal body with outwardly extending bosses comprising embossments and wherein the fixed inward blind hole nuts are disposed within the embossments.

9. The exhaust case assembly according to claim 1, wherein the exhaust cone and heat shield are joined together at a downstream end thereof.

10. The exhaust case assembly according to claim 9, wherein the exhaust cone and heat shield are joined together with a spot welded connection at the downstream end.

11. The exhaust case assembly according to claim 1, wherein the mounting bracket is disposed radially between the exhaust cone and the heat shield.

12. The exhaust case assembly according to claim 11, comprising a circumferential array of bolts and fixed inward blind hole nuts clamping the exhaust cone, mounting bracket and heat shield together on radial axes.

13. A method of heat shielding a bearing housing of a gas turbine engine, the bearing housing being within and coaxial to an exhaust case of the gas turbine engine, the method comprising:
    joining a heat shield to an internal surface of an exhaust cone; and then
    securing the exhaust cone to a mounting bracket extending from the exhaust case, the exhaust case defining an annular gas path.

14. The method according to claim 13 comprising:
    joining the mounting bracket of the exhaust case and exhaust cone together on a plurality of radial axes with a circumferential array of connectors.

15. The method according to claim 14 comprising:
    forming bores in the mounting bracket and exhaust cone, the bores being aligned on the radial axes through which the connectors extend.

16. The method according to claim 15 comprising:
    forming a circumferential array of inward recesses aligned on the radial axes on the external surface of the exhaust cone; and
    housing a head of each connector in the inward recesses.

17. The method according to claim 16 comprising:
    engaging a bolt connector with a fixed inward blind hole nut aligned on each radial axis of the radial axes.

18. The method according to claim 17 comprising:
    forming a circumferential array of outwardly extending bosses aligned on the radial axes on the external surface of the heat shield; and
    housing fixed inward blind hole nut in the outwardly extending bosses.

19. The method according to claim 13 comprising:
    spot welding the exhaust cone and heat shield together at a downstream end.

20. The method according to claim 13 comprising:
    securing the mounting bracket between the heat shield and the exhaust cone.

* * * * *